United States Patent
Chand et al.

(10) Patent No.: US 10,346,876 B2
(45) Date of Patent: Jul. 9, 2019

(54) IMAGE RECOGNITION ENHANCED CROWDSOURCED QUESTION AND ANSWER PLATFORM

(71) Applicants: Ashootosh Chand, Bangalore (IN); Bharathi Shekar, Bangalore (IN); Adit Gupta, Navi Mumbai (IN); Tarkeshwar Singh, Kolkata (IN); Jamey Graham, San Jose, CA (US)

(72) Inventors: Ashootosh Chand, Bangalore (IN); Bharathi Shekar, Bangalore (IN); Adit Gupta, Navi Mumbai (IN); Tarkeshwar Singh, Kolkata (IN); Jamey Graham, San Jose, CA (US)

(73) Assignee: Ricoh Co., Ltd., Tokyo (JP)

( * ) Notice: Subject to any disclaimer, the term of this patent is extended or adjusted under 35 U.S.C. 154(b) by 381 days.

(21) Appl. No.: 14/639,694

(22) Filed: Mar. 5, 2015

(65) Prior Publication Data
US 2016/0260130 A1 Sep. 8, 2016

(51) Int. Cl.
*G06Q 30/00* (2012.01)
*G06Q 30/02* (2012.01)
*G06F 16/583* (2019.01)
*G06F 16/58* (2019.01)

(52) U.S. Cl.
CPC ......... *G06Q 30/0256* (2013.01); *G06F 16/58* (2019.01); *G06F 16/5854* (2019.01)

(58) Field of Classification Search
CPC .................................................. G06Q 30/0256
See application file for complete search history.

(56) References Cited

U.S. PATENT DOCUMENTS

| | | | |
|---|---|---|---|
| 6,188,398 B1 * | 2/2001 | Collins-Rector | G06Q 30/02 348/E5.104 |
| 7,565,139 B2 | 7/2009 | Neven, Sr. et al. | |
| 8,495,489 B1 * | 7/2013 | Everingham | G06Q 30/02 707/621 |
| 8,520,979 B2 | 8/2013 | Conwell | |
| 8,620,772 B2 | 12/2013 | Owen | |
| 2004/0199435 A1 * | 10/2004 | Abrams | G06Q 30/06 705/27.2 |
| 2007/0239683 A1 * | 10/2007 | Gallagher | G06F 17/30265 |
| 2008/0059578 A1 * | 3/2008 | Albertson | G06F 3/016 709/204 |
| 2009/0030774 A1 * | 1/2009 | Rothschild | G06Q 30/02 705/14.1 |
| 2009/0248665 A1 | 10/2009 | Garg et al. | |

(Continued)

*Primary Examiner* — Bennett M Sigmond
*Assistant Examiner* — Scott C Anderson
(74) *Attorney, Agent, or Firm* — Patent Law Works LLP

(57) ABSTRACT

A crowdsourced question and answer platform enhanced with image recognition technology is disclosed. The platform generates and organizes conversations surrounding an object recognized from an image uploaded by a user. Generating and organizing conversations includes receiving an image a from a user, analyzing the image to recognize an object in the image, receiving a comment related to the recognized object in the image from the user, generating content related to the recognized object in the image based on the received comment and adding the content related to the recognized object in the image to a conversation corresponding to the recognized object in the image.

20 Claims, 10 Drawing Sheets

(56) References Cited

U.S. PATENT DOCUMENTS

| | | | |
|---|---|---|---|
| 2011/0320317 A1* | 12/2011 | Yuan | G06Q 30/0601 |
| | | | 705/26.61 |
| 2012/0117051 A1 | 5/2012 | Liu et al. | |
| 2012/0232989 A1* | 9/2012 | Musgrove | G06Q 30/0277 |
| | | | 705/14.49 |
| 2012/0233143 A1 | 9/2012 | Everingham | |
| 2013/0265450 A1* | 10/2013 | Barnes, Jr. | H04N 5/77 |
| | | | 348/207.1 |
| 2014/0032596 A1 | 1/2014 | Fish et al. | |

* cited by examiner

IMAGE RECOGNITION ENHANCED CROWDSOURCED QUESTION AND ANSWER PLATFORM

BACKGROUND

1. Field of the Art

The present specification generally relates to the field of image recognition and application of image recognition in various scenarios. More specifically, the present specification relates to a crowdsourced question and answer platform enhanced with image recognition technology.

2. Description of the Related Art

Image based searches for information is one of the few areas on the internet which is still relatively unexplored. Considering the number of consumer internet products that are focused around images, the ability to discover information from an input image is an area of opportunity. A lot of effort has gone into creating technologies that can match images to determine whether two images are identical (or at least substantially similar).

Additionally, current advertising structures present in various platforms force advertisers to predict what kind of content the user wants to see and design advertising content based on that prediction. The current advertising structures make it extremely difficult for advertisers to accurately determine contextual content relevant to what is being displayed to or searched for by a user, and in particular, to an image query submitted by the user. Further, current advertising platforms do not allow the advertiser to access and analyze user generated content in real time to present relevant advertisements.

SUMMARY

The techniques introduced herein provide for leveraging crowdsourcing and image recognition technology to build a platform which can allow users to quickly search for and discover relevant information through an image input. The platform allows users to create content around any image so that anybody else can rediscover the same content when they are directed to the image later as a result of their own image search.

Additionally, the techniques allow advertisers to gain access to a real time content feed from the crowdsourced image recognition system where the advertisers can see what questions are being asked by the users (based on certain filters like tags, locations, etc.) and serve content for the ones that are relevant to the brand represented by the advertiser. This allows advertisers to create content, which is relevant to the user and hence generate higher return on investment for the company.

The techniques include a system to receive an image from a first user. The system includes an image processor to analyze the image to recognize an object in the image and a conversation engine to receive a comment related to the recognized object in the image from the first user, to generate a content related to the recognized object in the image based on the received comment and to add the content related to the recognized object in the image to a conversation corresponding to the recognized object in the image.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques described herein are illustrated by way of example, and not by way of limitation, in the figures of the accompanying drawings in which like reference numerals are used to refer to similar elements.

The figures depict various embodiments of the techniques described herein for purposes of illustration only. It should be readily recognized from the following discussion that alternative embodiments of the structures and methods illustrated herein may be employed without departing from the principles of the techniques described herein.

DETAILED DESCRIPTION

Figure 1:
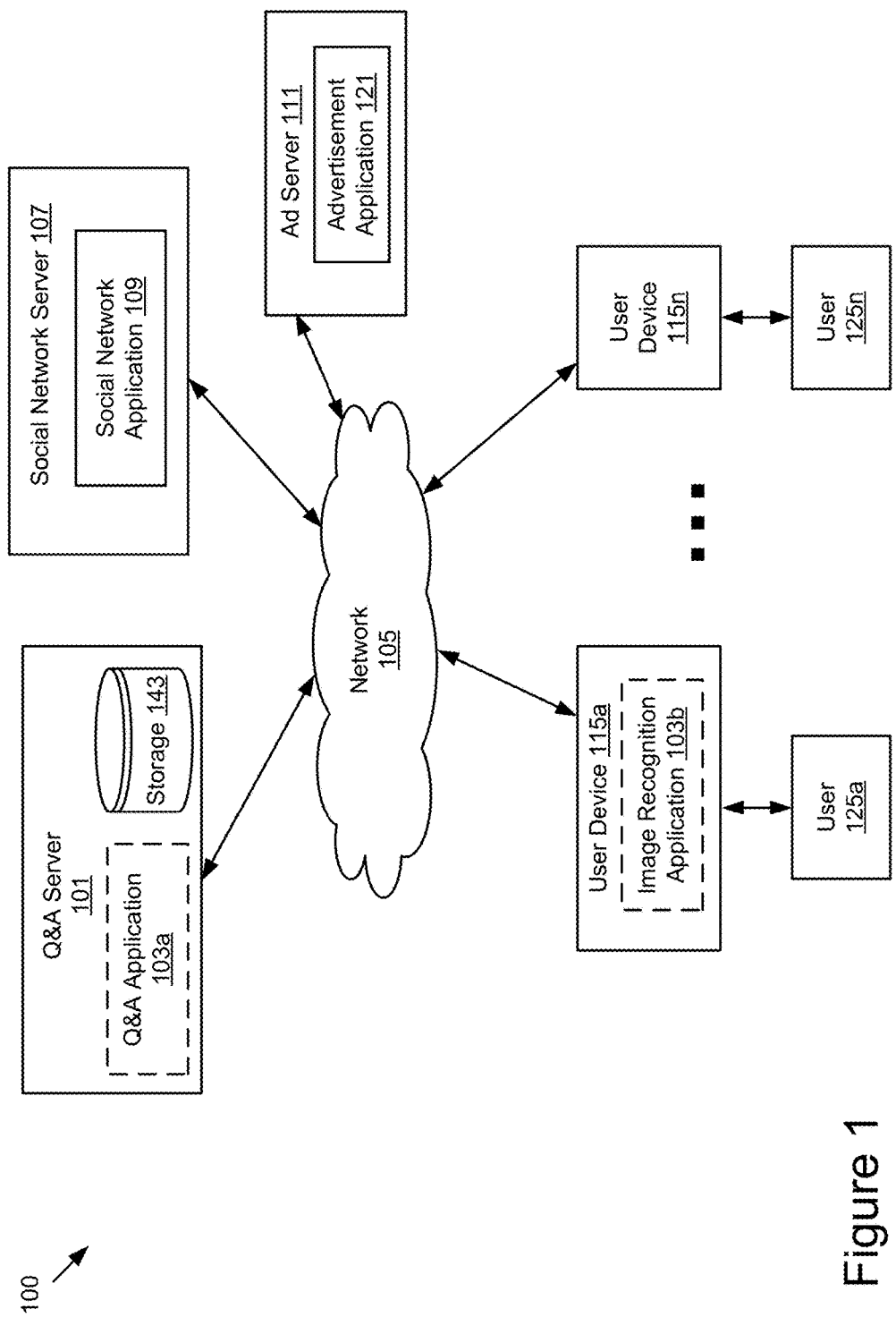
FIG. 1 is a high-level block diagram illustrating one embodiment of a system including a crowdsourced question and answer platform enhanced with image recognition technology.

FIG. 1 is a high-level block diagram illustrating one embodiment of a system 100 including a crowdsourced question and answer platform enhanced with image recognition technology. The illustrated system 100 includes user devices 115a . . . 115n that can be accessed by users 125a . . . 125n, Q&A server 101, a social network server 107 and an ad server 111. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth communication networks or a cellular communications network for sending and receiving data, including via short messaging service (SMS), multimedia messaging service (MMS), hypertext transfer protocol (HTTP), direct data connection, WAP, email, etc. Although FIG. 1 illustrates one network 105 coupled to the user devices 115, the Q&A server 101, the social network server 107 and the ad server 111, in practice one or more networks 105 can be connected to these entities.

In one embodiment, the system 100 includes a Q&A server 101 coupled to the network 105. The Q&A server 101 may be a computing device including a processor, a memory, network communication capabilities, and data storage (e.g., data storage 143). In the example of FIG. 1, the components of the Q&A server 101 are configured to implement a Q&A application 103a described in more detail below. In some embodiments, the Q&A server 101 sends and receives data to and from other entities of the system 100 via the network 105. For example, the Q&A server 101 sends and receives an image, data describing an image, an object associated with an image, the current location of user 125, tags associated with the image and/or an object in the image, comments related to the image and/or an object in the image, and a conversation associated with the image and/or an object in the image to and from the user device 115. The images received by the Q&A server 101 can include an image captured by the user device 115, an image copied from a website or an email, or an image from any other source. While the example of FIG. 1 includes one Q&A server 101, the system 100 may include one or more Q&A servers 101.

The data storage 143 is a non-transitory memory that stores data for providing the functionality described herein. The data storage 143 may be a dynamic random access memory (DRAM) device, a static random access memory (SRAM) device, flash memory or some other memory devices. In some embodiments, the data storage 143 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In one embodiment, the data storage 143 stores the images received by the Q&A server 101 and data associated with each image. For example, data storage 143 may store image detection results for each image including objects in the image, a plurality of tags associated with each object in the image, and/or a comment associated with the image. The data storage 143 may also be configured to store a plurality of conversations associated with images and objects in the images. The data storage 143 may also be configured to store user profiles. While the example of FIG. 1 includes a single data storage 143 as part of the Q&A server 101, it should be understood that data storage may be located elsewhere in the system 100. For example, a discrete storage device may be coupled with the Q&A server 101, via a local connection or over the network 105.

The social network server 107 can be a hardware server that includes a processor, a memory and network communication capabilities. The social network server 107 is coupled to the network 105 and, in some embodiments, the social network server 107 sends and receives data to and from one or more of the user devices 115a . . . 115n and the Q&A server 101 via the network 105. The social network server 107 also includes a social network application 109. A social network tracks users that share something in common. For example, people in the social network can be friends, they can follow each other, the social network can include a forum where people discuss a particular topic, etc. In one embodiment, the social network can include a user profile that lists interests that the user explicitly or implicitly provided, for based on the user joining a group, endorsing articles about particular subjects, etc. Furthermore, the social network server 107 may be representative of one social network and there may be multiple social networks coupled to the network 105, each having its own server and application.

In one embodiment, the social network application 109 may be a third-party social network that includes software and/or logic to present images and conversations associated with objects in the images to a user. In one embodiment, the social network application 109 may receive data describing an object in the image, tags associated with the object in the image and conversations related to the object in the image from the Q&A application 103 via the network 105.

The advertisement server 111 can be a hardware server that includes a processor, a memory and network communication capabilities, which is coupled to the network 105. The advertisement server 111 provides the Q&A server 101 with advertising content. In some embodiments, the advertisement server 111 may also provide advertisements directly to a user device 115.

The advertisement application 121 includes software and/or logic to generate advertisements related to a conversation. The advertisement application 121 allows an advertiser to track keywords, tags, and/or conversations on the Q&A server and send an advertisement related to a conversation to the Q&A application 103 via network 105 for display to users viewing the conversation. In one embodiment, the advertisement may be based on the conversation related to the object in the image or the profiles of other users participating in the conversation. For example, the advertiser may choose to add a comment and/or advertisement to a conversation that is less than a threshold number of days old or, the advertiser may choose to present the comment and/or advertisement to a particular group of users with specific profile attributes. For example, the advertiser may choose to answer a question in a conversation and add an advertisement related to the conversation. In another embodiment, the advertiser may provide a dynamic deal to the users associated with the conversation. In some embodiments, the advertisement application 121 promotes the advertisement related to the conversation to other users, for example via social network 107. In some embodiments, promotions may be limited to a pre-determined number of users based on the advertising plans that the advertiser have selected and users may choose to block any promotion or advertisement after they capture an image and generate a conversation.

The user devices 115a . . . 115n depicted in FIG. 1 are used by way of example. In some embodiments, the user devices 115a . . . 115n may each be a computing device that includes a memory, a processor and a camera, for example a laptop computer, a desktop computer, a tablet computer, a mobile telephone, a personal digital assistant (PDA), a mobile email device, a webcam or any other electronic device capable of accessing a network 105. The user device 115 includes a display for viewing information provided by the Q&A server 101. While FIG. 1 illustrates two user devices 115a and 115n, the disclosure applies to a system architecture having one or more user devices 115.

In one embodiment, the Q&A application 103 includes software and/or logic to detect and recognize objects in an image, receive a location associated with the image, generate a user profile, receive one or more tags associated with the objects in the image, generate a conversation related to the object in the image, receive an advertisement related to the object in the image, add the received advertisement to the conversation, and present the conversation to the user. In some embodiments, the Q&A application 103 can be implemented using programmable or specialized hardware, such as a field-programmable gate array (FPGA) or an application-specific integrated circuit (ASIC). In some other embodiments, the Q&A application 103 can be implemented using a combination of hardware and software. In some embodiments, the Q&A application 103 may be stored and executed by a combination of the user devices 115 and the Q&A server 101, or by any one of the user devices 115 or Q&A server 101.

In some embodiments, a user device 115 may be configured to run all or part of the Q&A application 103. For example, in one embodiment, the Q&A application 103b acts as a thin-client application with some functionality executed on the user device 115 and additional functionality executed on the Q&A server 101 by Q&A application 103a. For example, the Q&A application 103b on the user device 115a could include software or routines for capturing one or more images of products, transmitting the images to the Q&A server 101, and displaying image recognition results. A thin-client application 103b may include other functionality described below with reference to Q&A application 103, for example, object detection and/or recognition.

In one embodiment, the Q&A application 103 is configured to analyze the image, detect and recognize objects in an image, receive a plurality of tags associated with the image, and generate a conversation associated with the image. For example, the Q&A application 103b sends an image, tags associated with the image and/or conversation associated with the image to the Q&A application 103a on the Q&A server 101. The Q&A application 103 may use conventional public or proprietary methods for detecting objects in the image and recognizing the objects. The Q&A application 103a on Q&A server 101 may provide data in a computer readable format, e.g., JSON (JavaScript Object Notation) format, about one or more objects recognized in the image to the user device 115a. For example, the data may include an object ID associated with each recognized object in the image, information identifying one or more tags associated with each recognized object in the image, and information identifying conversations related to each recognized object in the image.

For example, in one embodiment, the Q&A application 103 receives an image of a particular product (e.g., a shoe). The Q&A application recognizes an object in the image, receives one or more tags associated with the object in the image, receives content related to the object in the image, identifies if a conversation associated with the image exists, generates a conversation if no previous conversation exists, and/or adds the content to an existing conversation. The process is described in more detail below.

Figure 2:
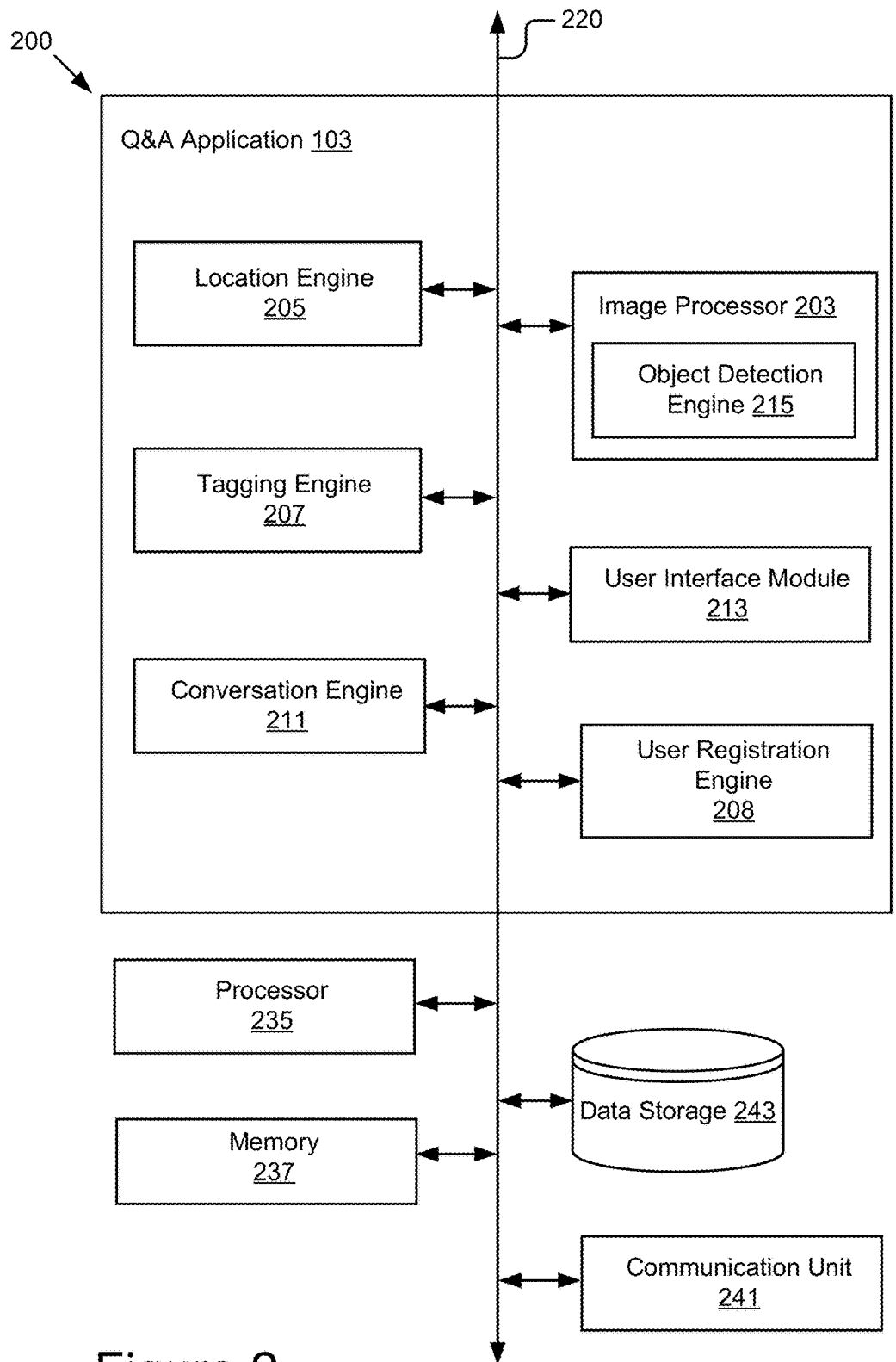
FIG. 2 illustrates a block diagram of an example system including a Q&A application.

FIG. 2 illustrates a block diagram of an example system 200 including a Q&A application 103. For example, system 200 may be a user device 115, a Q&A server 101, or a combination of a user device 115 and a Q&A server 101, as described above. In the example of FIG. 2, the system 200 includes a Q&A application 103, a processor 235, a memory 237, a communication unit 241, and data storage 243. The Q&A application 103 includes an image processor 203, a location engine 205, a tagging engine 207, a user registration engine 208, a conversation engine 211, and a user interface module 213. In one embodiment, a bus 220 communicatively couples the components of the system 200. The bus 220 may represent one or more buses including an industry standard architecture (ISA) bus, a peripheral component interconnect (PCI) bus, a universal serial bus (USB), or some other bus known in the art to provide similar functionality.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, a Graphics Processing Unit (GPU), and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the system 200 including, for example, the image processor 203, the location engine 205, the tagging engine 207, the user registration engine 208, the conversation engine 211, the user interface module 213, the memory 237, the communication unit 241, and the data storage 243. It will be apparent that other processors, sensors, displays and physical configurations are possible.

The memory 237 may store and provide access to data for the other components of the system 200. The memory 237 may be included in a single computing device or a plurality of computing devices as discussed elsewhere herein. In some implementations, the memory 237 may store instructions and/or data that may be executed by the processor 235. For example, in one embodiment, the memory 237 may store instructions, which when executed by the processor, causes the processor to implement the Q&A application 103, including the image processor 203, the location engine 205, the tagging engine 207, the user registration engine 208, the conversation engine 211 and the user interface module 213. The memory 237 may also be capable of storing other instructions and data, including, for example, an operating system, hardware drivers, other software applications, databases, etc. The memory 237 may be coupled to the bus 220 for communication with the processor 235 and the other components of the system 200.

The memory 237 may include one or more non-transitory computer-usable (e.g., readable, writeable, etc.) mediums, which can be any tangible apparatus or device that can contain or store instructions, data, computer programs, software, code, routines, etc., for processing by or in connection with the processor 235. In some implementations, the memory 237 may include one or more of volatile memory and non-volatile memory. For example, the memory 237 may include, but is not limited to, one or more of a dynamic random access memory (DRAM) device, a static random access memory (SRAM) device, an embedded memory device, a discrete memory device (e.g., a PROM, FPROM, ROM), a hard disk, an optical disk (CD, DVD, Blue-Ray™, etc.). It should be understood that the memory 237 may be a single device or may include multiple types of devices and configurations.

The communication unit 241 is hardware for receiving and transmitting data by coupling the processor 235 and other components of the system 200 to the network 105 and other processing systems. The communication unit 241 is configured, for example, to receive the one or more images from the user device 115 and/or transmit detected objects, a plurality of tags associated with the objects in the images and/or, a conversation related to the objects in the images. In one embodiment, the communication unit 241 may include a port for direct physical connection to the network 105 or to another communication channel. For example, the communication unit 241 may include an RJ45 port or similar port for wired communication with the network 105. In another embodiment, the communication unit 241 may include a wireless transceiver (not shown) for exchanging data via the network 105 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP.

The data storage 243 is a non-transitory memory that stores data for use in providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk, a floppy disk, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. In one embodiment, the data storage 243 stores one or more images received from the user device 115 and data associated with the one or more images. For example, data storage 243 may store image detection results for each image including one or more detected objects in the image, a location associated with the image, information from one or more user profiles including the demographic information of the user(s), input from one or more users 125 including a plurality of tags related to the objects in the image, and/or one or more comments associated with the objects in the image. The data storage 243 may also be configured to store a conversation associated with the object in the images.

The image processor 203 includes an object detection engine 215. The object detection engine 215 includes software and/or logic to detect and recognize objects in an image. While a shoe is used throughout the specification as an example of an object, objects may be other recognizable features in an image of any environment, for example, dresses, documents, books, posters or the like. The object detection engine 215 may detect and recognize objects in an image according to existing public and/or proprietary image recognition algorithms. In some embodiments, the object detection engine 215 may be implemented using programmable or specialized hardware including a field programmable gate array (FPGA) or an application-specific integrated circuit (ASIC). In some embodiments, the object detection engine 215 may be implemented using a combination of hardware and software executable by processor 235. In some embodiments, the object detection engine 215 is a set of instructions executable by the processor 235. In some embodiments, the object detection engine 215 is instructions stored in the memory 237 and is accessible and executable by the processor 235. In some embodiments, the object detection engine 215 is adapted for cooperation and communication with the processor 235, the memory 237 and other components of the image recognition application 203 via the bus 220.

Although the Q&A application 103 depicted in the example of FIG. 2 includes a single image processor 203, it should be recognized that one or more additional image processors may be used for object detection and recognition. In various embodiments, the image processor 203 outputs image detection results including an object ID. The output may be used to access or generate a conversation related to the recognized objects in the one or more received images as described in more detail below.

The location engine 205 can be software including routines for determining a location associated with a user. In one embodiment, the location engine 205 can be a set of instructions executable by the processor 235 to provide the functionality described below for determining a location associated with a user. In another embodiment, the location engine 205 can be stored in the memory 237 of the system 200 and can be accessible and executable by the processor 235. In either embodiment, the location engine 205 can be adapted for cooperation and communication with the processor 235 and other components of the system 200 via the bus 220.

In one embodiment, the location engine 205 identifies a location associated with a user using global positioning system (GPS) coordinates. For example, the location engine 205 receives data describing GPS coordinates from a user device 115 (e.g., a mobile phone) with consent from a user 125, and determines a location associated with the user using the received GPS coordinates. In one embodiment, the location engine 205 sends location data describing the user's location to the conversation engine 211 via the bus 220 and/or the advertisement application 121 via network 105. In another embodiment, the location engine 205 stores the location data in the data storage 243.

The tagging engine 207 may include software and/or logic to receive a plurality of tags for each detected object in an image received from the user device 115. For example, the tagging engine 207 prompts a user to enter words and/or phrases that can be used to help recognize or categorize the object in the image. In one embodiment, the tagging engine 207 may be configured to restrict the maximum number of words that the user may use while tagging the object in the image. In another embodiment, the tagging engine 207 may be configured to allow the user to enter more than one tag describing the object in the image. In some embodiments, the tagging engine 207 may be implemented using programmable or specialized hardware including a field-programmable gate array (FPGA) or an application-specific integrated circuit (ASIC). In some embodiments, tagging engine 207 may be implemented using a combination of hardware and software executable by processor 235. In other embodiments, the tagging engine 207 is a set of instructions executable by the processor 235. In some implementations, the tagging engine 207 is instructions stored in the memory 237 and is accessible and executable by the processor 235. In some embodiments, the tagging engine 207 is adapted for cooperation and communication with the processor 235, the memory 237 and other components of the system 200 via the bus 220.

The user registration engine 208 can be software including routines for registering a user. In one embodiment, the user registration engine 208 can be a set of instructions executable by the processor 235 to provide the functionality described below for registering a user. In another embodiment, the user registration engine 208 can be stored in the memory 237 of the system 200 and can be accessible and executable by the processor 235. In either embodiment, the user registration engine 208 can be adapted for cooperation and communication with the processor 235 and other components of the system 200 via the bus 220.

In one embodiment, the user registration engine 208 receives a registration request from a user device 115 operated by a user. The user registration engine 208 generates data describing a registration form for the user and sends the data to the user interface module 213, causing the user interface module 213 to generate data for providing a user interface. The user interface module 213 sends the data to the user device 115, causing the user device 115 to present the user interface to the user. The user can input personal information (e.g., a user name, password, age, gender, occupation, address, interests, hobbies, likes, dislikes, advertising options, etc.) in the user interface and send the personal information to the user registration engine 208. The user registration engine 208 generates a user profile for the user that includes the personal information inputted by the user. For example, the user profile includes demographic information inputted by the user.

In one embodiment, the user registration engine 208 retrieves social data describing social activities performed on a social network from the social network 107 with the consent of users, and determines one or more user preferences for a user based on the social activities. In one embodiment, the one or more user preferences are included in a user profile associated with the user.

In another embodiment, the user registration engine 208 retrieves data describing one or more interests of the user from the social network, and determines one or more user preferences based on the user's interests. In yet another embodiment, the user registration engine 208 retrieves data describing one or more interests of other users (e.g., friends) that are connected to the user in a social graph from the social network, and determines one or more user preferences based on the interests of other users connected to the user.

The conversation engine 211 may include software and/or logic to generate a conversation for each detected object in the images received from the user device 115. In some embodiments, the conversation engine 211 may include software and/or logic to receive a comment from a user and adding the comment from the user to a pre-existing conversation. In some embodiments, the conversation engine 211 may be implemented using programmable or specialized hardware including a field-programmable gate array (FPGA) or an application-specific integrated circuit (ASIC). In some embodiments, conversation engine 211 may be implemented using a combination of hardware and software executable by processor 235. In other embodiments, the conversation engine 211 is a set of instructions executable by the processor 235. In some implementations, the conversation engine 211 is instructions stored in the memory 237 and is accessible and executable by the processor 235. In some implementations, the conversation engine 211 is adapted for cooperation and communication with the processor 235, the memory 237 and other components of the system 200 via the bus 220. The function of conversation engine 211 is described in more details below with reference to FIGS. 4 and 5.

The user interface module 213 can be software including routines for generating data for providing a user interface. In one embodiment, the user interface module 213 can be a set of instructions executable by the processor 235 to provide the functionality described below for generating data for providing a user interface. In another embodiment, the user interface module 213 can be stored in the memory 237 of the system 200 and can be accessible and executable by the processor 235. In either embodiment, the user interface module 213 can be adapted for cooperation and communication with the processor 235 and other components of the system 200 via the bus 220.

Figure 4:
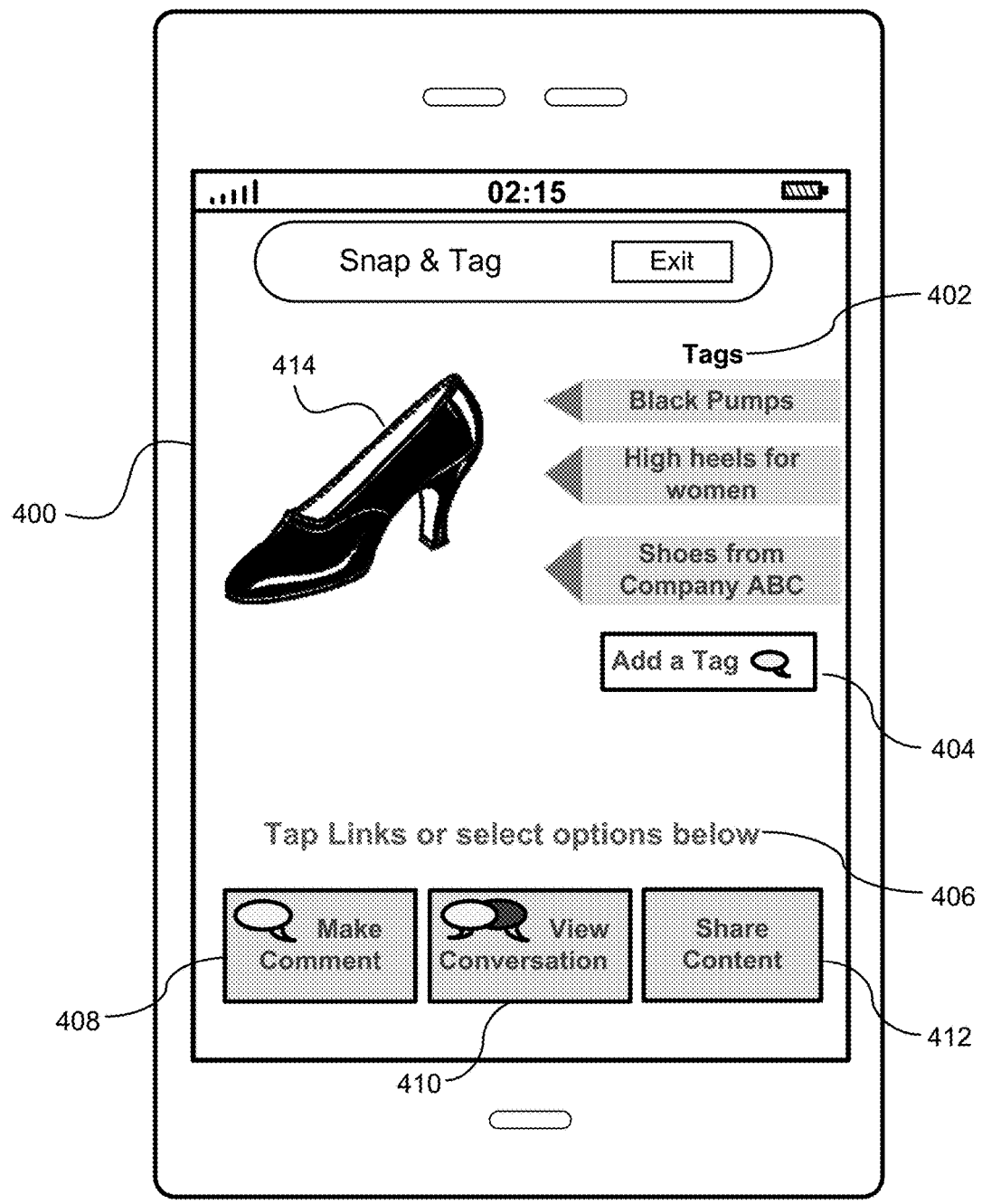
FIG. 4 illustrates an example of a graphic representation of a user interface for a question and answer platform.

In one embodiment, the user interface module 213 generates data for providing a user interface for the Q&A application. The user interface module 213 sends the data to a user device 115 operated by a user, causing the user device 115 to present the platform to the user via the user interface. An example user interface is illustrated in FIG. 4. In another embodiment, the user interface module 213 generates a graphical interface to provide a registration form for the user. In yet another embodiment, the user interface module 213 generates data for providing a user interface that depicts a deal to a user. In other embodiments, the user interface module 213 may generate data for providing other user interfaces to users.

Figure 3:
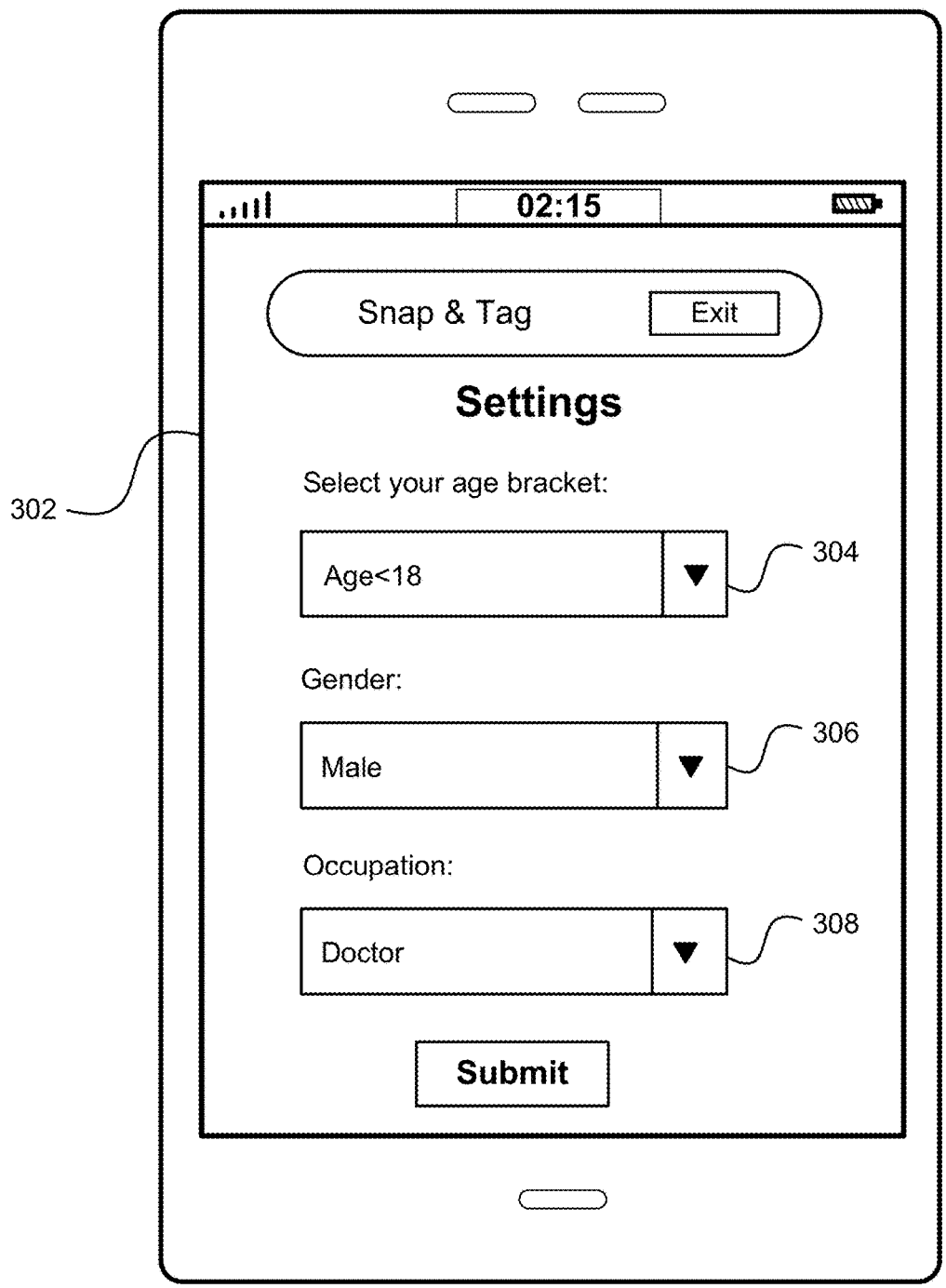
FIG. 3 illustrates an example graphic representation of a user interface for creating a user profile.

FIG. 3 illustrates an example graphic representation of a user interface 302 for creating a user profile. The user interface 302 may be generated by the user interface module 213 and displayed on a user device 115. In the example of FIG. 3, a user interface 302 is presented to the user on the user device 115, allowing the user to register with the application. The user interface 302 provides dropdown menus and/or form fields for the user to populate to provide information such as demographic information. In the example of FIG. 3, the user profile information includes dropdown menus for the user to provide profile information such as age 304, gender 306, and occupation 308 to the user registration engine 208 via the user interface 302.

FIG. 4 illustrates an example of a graphic representation of a user interface 400 for a question and answer platform. In the example of FIG. 4, the user interface 400 may be displayed on a user device 115, such as a smart phone, tablet computer, or the like. In the example of FIG. 4, the user interface module 213 generates a user interface 400 that allows a user to generate and read content related to a recognized object 414 in an image captured by a camera of the mobile device or loaded in the application by the user.

The user interface 400 displays the object 414, tags 402 that optionally provide additional information related to the object 414 in the image, a button 404 that allows the user to add a tag associated with the object 414, question and answer options that allow the user to make a comment 408, view a conversation 410 about the object 414 and share content 412 (e.g., using email, text, social networking systems, etc.). For example, as shown in FIG. 4, the tags section 402 includes tags like "black pumps", "high heels for women", and "shoes from Company ABC", all of which are associated with the object 414. In one embodiment, the tags 402 are selectable buttons which, when selected, cause the user interface 400 to display other objects that are associated with the tags. For example, if the user selects black pumps, the user interface 400 will display images that include black pumps and also have the "black pumps" tag associated with them.

Selecting the make comment button 408 causes the user interface 400 to display an interface for entering a statement or a question about the object 414 in the image. Selecting the view conversation button 410 causes the user interface 400 to display a conversation about the object 414 in the image. It will be recognized that the user interface 400 can be modified to display a view discussion icon for displaying all existing discussion threads that are associated with a similar image and/or images that have similar tags related to them. For example, the view discussion icon may display a plurality of conversations associated with the tags (e.g., "black pumps", "high heels for women", "shoes from Company ABC") related to the object (e.g., a shoe) in the image. Selecting the share content button 412 causes the user interface 400 to provide the user with options to share the content related to the object 414 with others, e.g., by email, text, or sharing via other social networking systems.

Figure 5:
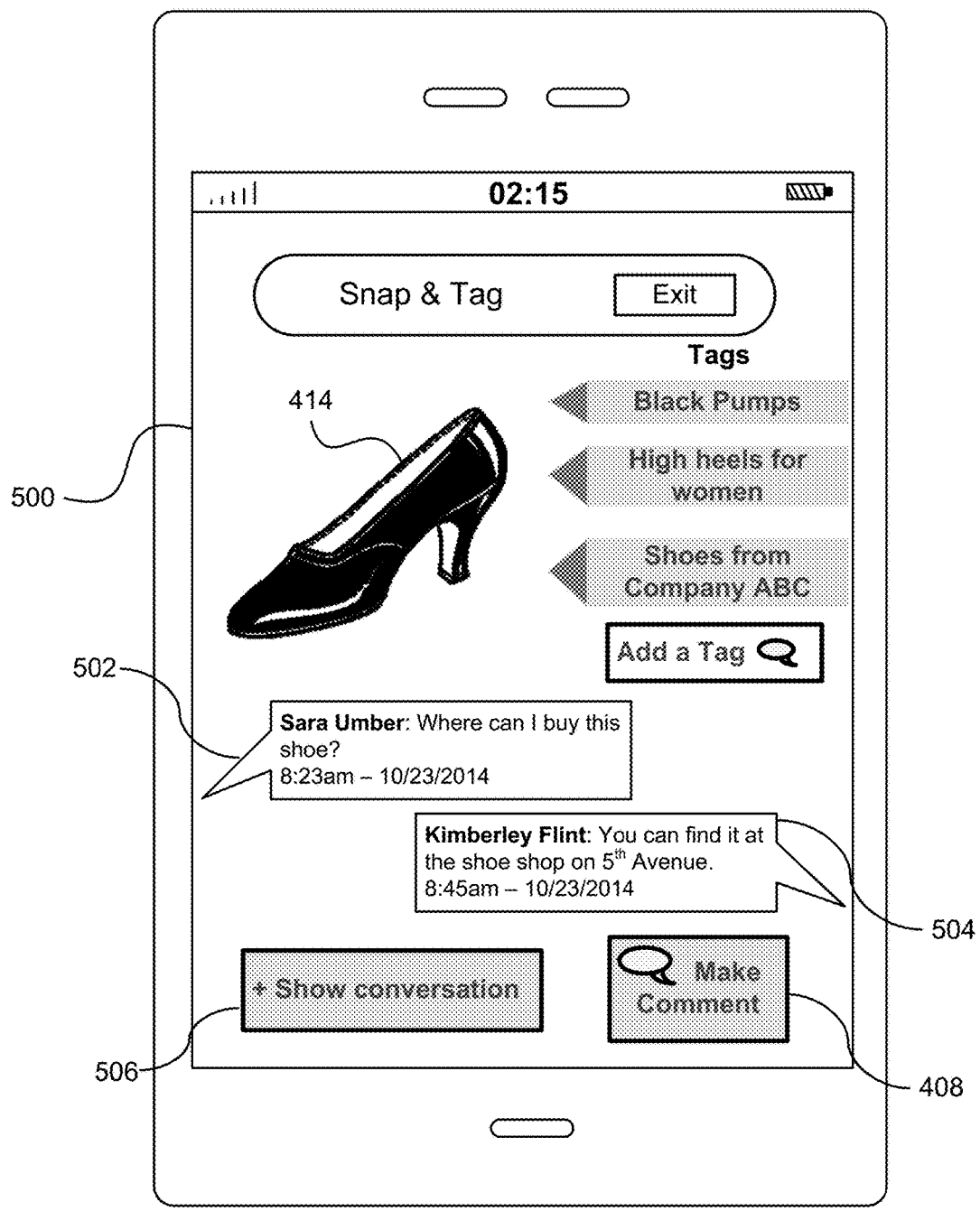
FIG. 5 illustrates an example of a graphic representation of a user interface for displaying a conversation associated with an object in an image.

FIG. 5 illustrates an example of a graphic representation of a user interface 500 for displaying a conversation associated with an object 414 in an image. For example, the user interface module 213 displays user interface 500 in response to a user selecting the view conversation button 410 displayed on user interface 400 in the example of FIG. 4. In the example of FIG. 5, only a portion of the conversation thread is shown. In cases where the entire conversation is not visible on the user interface 500, the user interface 500 includes a show conversation 506 button that provides the user with the entire conversation thread related to the object 414 in the image. In the example of FIG. 5, the comments 502 and 504 appear in chronological order. In various embodiments, each comment may include the name of the user who submitted the comment associated with the object 414 in the image, the content of the comment, a time and date when the comment was posted, etc. In one embodiment, the comment may be one or more questions associated with the object 414 in the image. In another embodiment, the comment may be an answer to a previously posted question associated with the object 414 in the image. In yet another embodiment, the comment may be a general statement related to the object 414 in the image. In yet another embodiment, the comment may include an advertisement for the object 414 in the image and/or an advertisement of another object that is similar or related to the object 414 in the image 414 submitted by an advertiser as described in more detail below. The user interface 500 also includes an option 408 to make a comment associated with the existing thread of comments or with the object 414 in the image.

Figure 6:
FIG. 6 illustrates an example of a user interface for promoting advertisement to users.

In some embodiments, a comment including an advertisement may include all of the information provided by the advertiser. For example, the promotional details, store locations, etc. In other embodiments, the comment includes a link to an advertisement. For example, FIG. 6 illustrates an example of a user interface 600 for promoting an advertisement to users who click on an advertising link in a comment. In one embodiment, the user interface 600 includes a deal from Company ABC that is related to the object 414 in the image about which a conversation is being presented to a user. For example, the deal may include a percentage discount and/or an address of a shop of Company ABC which is nearest to the user. In one embodiment, the deal may be from an advertiser, who is trying to promote Company ABC. The deal may be presented, for example, to those users who have tagged Company ABC in an image and/or those users who have tagged products that Company ABC sells in any of their images.

Figure 7:
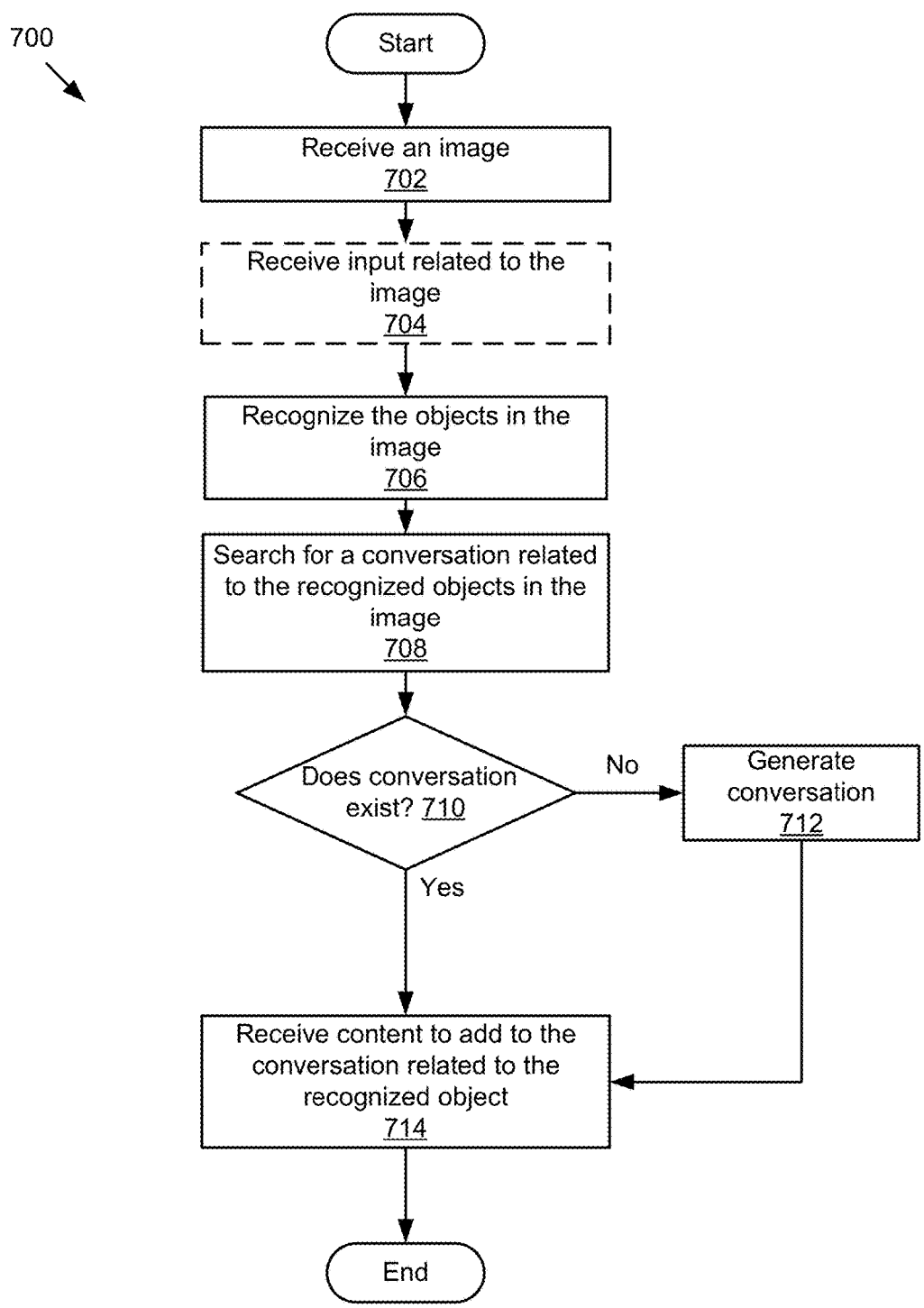
FIG. 7 is a flow diagram of an example method for contributing content to a conversation related to an object recognized in a received image.

FIG. 7 is a flow diagram of an example method for contributing content to a conversation related to an object recognized in a received image of one or more objects. At 702, the Q&A application 103 receives an image of one or more objects (e.g., a shoe on a store display). For example, the Q&A application 103 may receive one or more images captured by a user of user device 115. At 704, the tagging engine 207 optionally receives input related to the image from a user. For example, the user may provide one or more tags that describe an object captured in the image. At 706, the image processor 203 processes the image to detect and/or recognize one or more objects in the image. For example, as described above, the image processor 203 includes an object detection engine 209 that detects one or more objects in the image. The object detection engine 209 may use known public or proprietary object detection and/or recognition algorithms to detect and/or recognize the objects in the received image. At 708, the conversation engine 211 searches for a conversation related to an object of the one or more objects recognized in the image. For example, using the identity of the object determined by the image processor 203 and/or tags input by the user, the conversation searches for existing conversations related to the object and/or tags. At 710, the conversation engine 211 determines whether a conversation related to the object already exists. For example, the conversation engine searches conversations stored on storage 143 for keywords/tags related to the object in the image. In some embodiments, the conversation engine 211 creates and maintains an index of conversations to increase the speed and accuracy of the search. If no conversation related to the object recognized from the image exists, the conversation engine 211 generates a new conversation at 712. If a conversation related to the object recognized in the image exists or the conversation engine has generated a new conversation, the conversation engine 211 receives, at 714, content from a user (e.g., a question, comment, or the like) to add to the existing conversation related to the object recognized in the image. In one embodiment, if a conversation related to the object recognized in the image exists, the conversation engine 211 presents the existing conversation to the user prior to receiving content from the user to add to the existing conversation. If the conversation is insufficient to answer the query of the user, the user may select an option to add one or more questions and/or comments to the conversation. In one embodiment, even though a conversation related to the recognized object may exist, the user may create a new conversation related to the recognized object and add one or more questions and/or comments to the newly created conversation.

Figure 8:
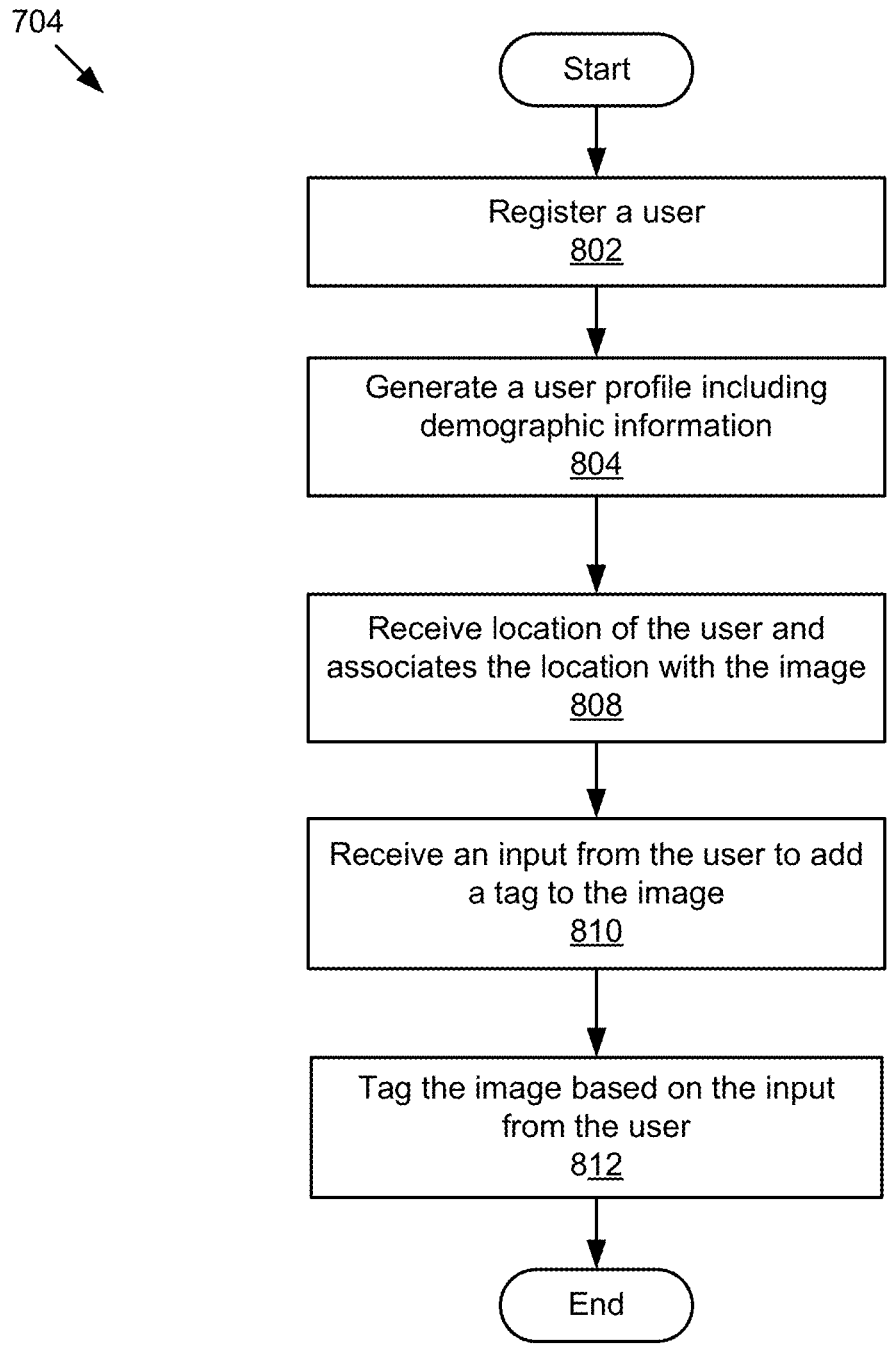
FIG. 8 is a flow diagram of an example method for receiving input related to a received image.

FIG. 8 is a flow diagram of an example method 704 for receiving input related to a received image. At 802, the user registration engine 208 registers a user. At 804, the user registration engine 208 generates a user profile that includes a set of demographic information associated with the user. For example, the user explicitly or implicitly states that the user is interested in black shoes from Company ABC. At 808, the location engine 205 receives a location associated with the user's current location (e.g., using geolocation hardware and/or software on the user device 115) and associates the location with the received image. At 810, the tagging engine 207 receives an input from the user to add a tag to the image. As described above, the tags help in broad classification of the image category and can be used to assist in object detection/recognition. The input may be one or more tags associated with the object in the image. For example, the tags may describe the object in the image and/or provide a context for the object in the image. At 812, the tagging engine 207 tags the image based on the received input from the user. In the example of a shoe on a store shelf, the tags may include, black pumps, high heels for women and shoes from Company ABC.

Figure 9:
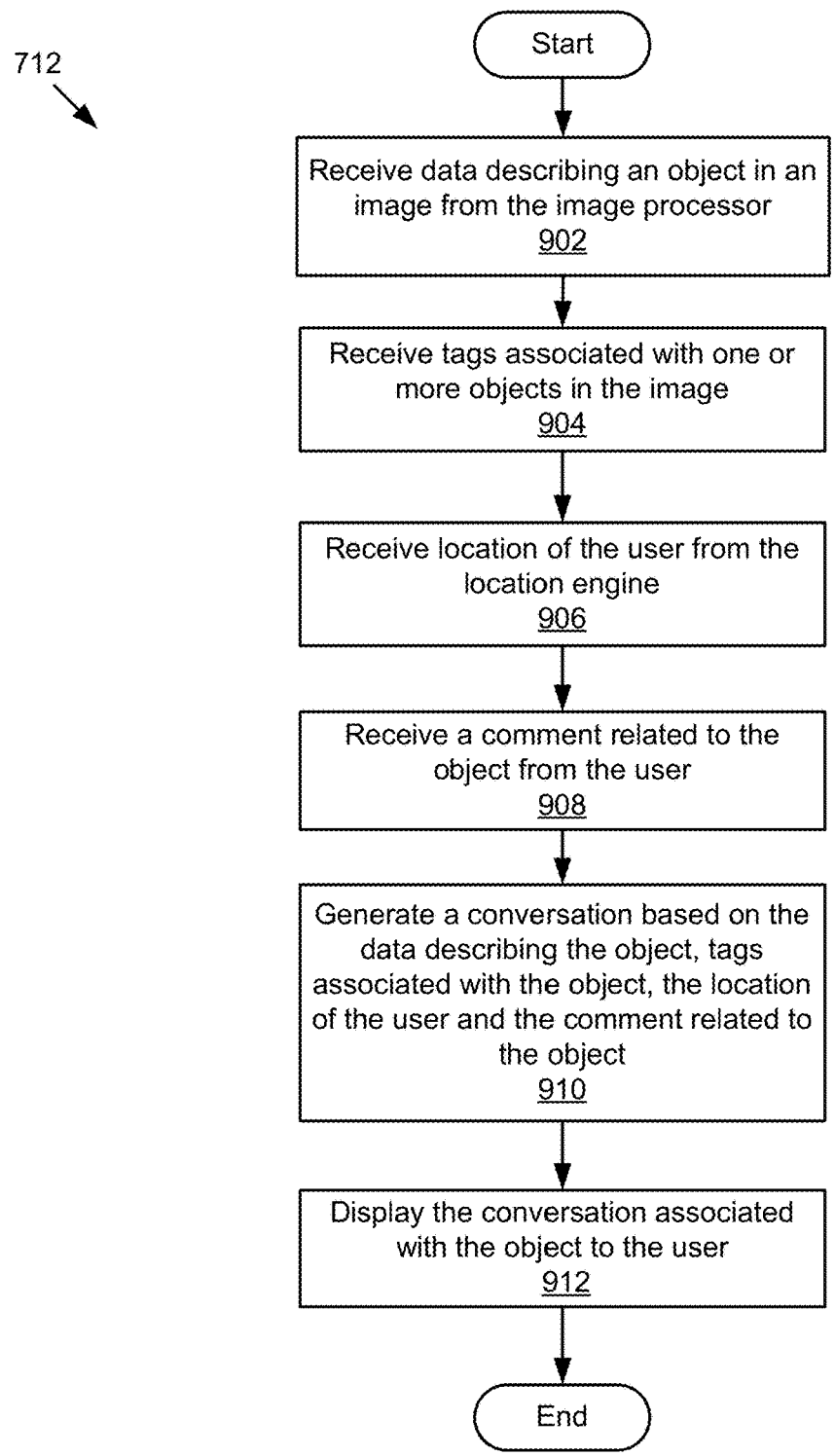
FIG. 9 is a flow diagram of an example method for generating a conversation related to a received image.

FIG. 9 is a flow diagram of an example method 712 for generating a conversation related to an object in a received image. At 902, the conversation engine 211 receives data describing an object in an image from the image processor 203. In one embodiment, the data may include image recognition results including a recognition of one or more objects in the image. The image processor 203 may provide the data in a computer readable format, for example, JSON (JavaScript Object Notation) format. At 904, the conversation engine 211 may optionally receive tags associated with one or more objects in the image from the tagging engine 207. At 906, the conversation engine 211 receives location of a user from the location engine 205.

At 908, the conversation engine 211 receives a comment related to the object in the image from the user. In one embodiment, the comment may be one or more questions associated with the object in the image. For example, the user may be prompted to enter the comment into pre-decided query category types (e.g., what, where, when, how). In another embodiment, the comment may be an answer to a previously posted question associated with the object in the image. In another embodiment, the comment may be a general statement related to the object in the image. In yet another embodiment, the comment may include an advertisement for the object in the image and/or an advertisement for a product that is similar to the object in the image.

At 910, the conversation engine generates a conversation based on the data describing the object, tags associated with the object, the location of the user and the comment related to the object. In one embodiment, the conversation may include one or more comments received from the user. At 912, the user interface module 213 generates a user interface to display the conversation associated with the object to the user. In one embodiment, the conversation engine 211 limits the display of the conversation to only those users who are located within a threshold proximity to the location where the image was submitted. For example, if a user from New York captures an image of a black shoe and inquires about a shop which sells such a shoe, then the conversation may be displayed to those users whose current location is New York. In one embodiment, the conversation engine 211 may track interests that the users may explicitly or implicitly provide. For example, the conversation engine may determine from the social network application 109 that a first user may be interested in sci-fi movies. If a second user captures an image of a sci-fi movie poster and adds a comment along with the image, the image is more likely to be presented to the first user. In another embodiment, the conversation may be surfaced to those users who have interest in the object in the image (e.g., users who have commented on similar objects and/or have submitted tags associated with the image). For example, if a user captures an image of running shoes, the conversation may be displayed to those users whose profiles indicate that they are interested in running In yet another embodiment, users may choose to follow one or more tags and the conversation may be displayed to those users who follow the tags associated with the conversation.

Figure 10:
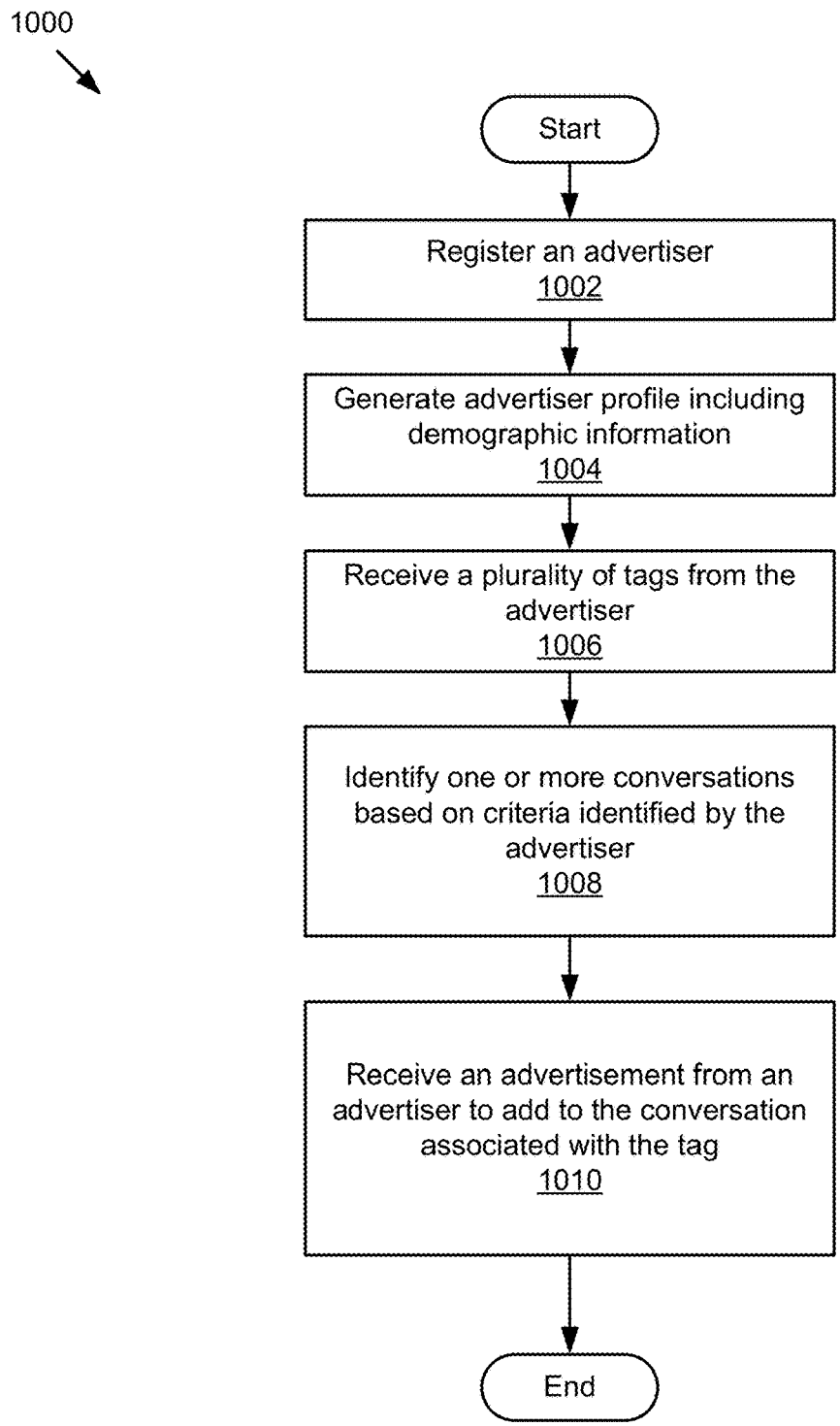
FIG. 10 is a flow diagram of an example method for presenting advertisements related to a conversation.

FIG. 10 is a flow diagram of an example method for presenting advertisements related to a conversation. At 1002, the advertisement application 121 registers an advertiser. In one embodiment, the advertisers may create an account by providing product and/or company details. In another embodiment, the advertiser may create an account after providing an authentication code. The authentication code may be verified by the system administrators to protect the users of the system from spam and malicious users. At 1004, the user registration engine 208 generates an advertiser profile that includes demographic information associated with the advertiser and/or company. For example, the advertiser may list products and/or companies represented by the advertiser and that the advertiser wishes to promote. In one embodiment, the advertiser may be prompted to select one or more advertising plans as a part of generating the advertiser profile. For example, the advertiser may be presented with advertising plans that provide the advertiser with varying levels of access and advertising capabilities based on the price of the selected plan. In various embodiments, the advertising plans may include a set number of advertisements that the advertiser may promote in a given time period, a set number of tags or conversations that an advertiser can follow and/or contribute to, size and content limits for advertisements, and the like.

At 1006, the advertisement application 121 receives a plurality of tags from the advertiser and adds the tags to the profile of the advertiser as tags that the advertiser would like to follow. In one embodiment, the advertiser may be allowed to see, subscribe to, and/or follow tags that are being used by other users in conversations. In another embodiment, the advertiser may be allowed to follow a threshold number of tags based on the advertising plan selected. At 1008, the advertisement application 121 identifies one or more conversations based on criteria identified by the advertiser. For example, the criteria may include tags that the advertiser is following matching tags associated with the conversation, a popularity of the conversation, and profiles of users participating in the conversation. In an embodiment, the advertiser's ability to access users' information may be limited by advertising options previously selected by each user and stored in the user's profile. In one embodiment, threshold levels for criteria that the advertisement application 121 uses to identify conversations are selected by an advertiser and stored as part of the advertiser's profile and/or settings. For example, the advertiser may indicate that he/she wants to see conversations that are related to a particular product (based on the tags associated with the conversation), that have had active user participation within a threshold period of time, that have a threshold number of users who are participating and/or following the conversation, and/or that have participants within a threshold distance from a particular location. In some embodiments, the advertiser may be allowed to follow tags to track conversations related to competitors. After identifying the conversations that meet the criteria chosen by the advertiser (or some default set of criteria), the advertisement application 121 displays the conversations to the advertiser and allows the advertiser to select one or more conversations in which to comment and/or promote a product or company. The advertiser may be allowed to view and respond to questions or comments in conversations in real time. In an embodiment, the advertiser may be allowed to view conversations along with the popularity of each question and comment, as well as the location from where the question or comment was asked. In an embodiment, on selecting a conversation in which to comment, the advertiser may view general details about the user based on the user's profile and if allowed by advertising options previously selected by the user that are stored in the user's profile.

At 1010, the advertisement application 121 receives comments and/or advertisements from the advertiser to add to the conversation associated with the tag. For example, the advertiser may choose to answer a question in a conversation and add an advertisement related to the conversation. In one embodiment, the advertiser may be allowed to respond only to users' questions in a conversation, while in another embodiment, the advertiser may be allowed to respond to any of the users' comments or questions in a conversation. In another embodiment, after providing a comment and/or advertisement in a conversation, the advertiser would be allowed to promote the comment and/or advertisement to other users, for example via social network 107. Similarly, the advertiser may be allowed to promote the comment and/or advertisement to other users based on advertising options previously selected by those other users that are stored in their user profiles. In another embodiment, the advertiser may provide a dynamic deal to the users associated with the conversation. In one embodiment, the advertiser may customize content of an advertisement presented to a user based on the user profile associated with the user who posed the question or made the comment to which the advertiser is responding.

A crowdsourced question and answer platform enhanced with image recognition technology has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the techniques may be implemented using any type of computing system that can receive data and commands, and present information as part of any peripheral device providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the techniques to the precise form disclosed. Many modifications and variations are possible in light of the above teaching. It is intended that the scope of the embodiments be limited not by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats. Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, known to those of ordinary skill in the art of computer programming. Additionally, the techniques are in no way limited to implementation in any specific programming language, or for any specific operating system or environment. Accordingly, the specification is intended to be illustrative, but not limiting, of the scope of the claims, which are set forth below.

What is claimed is:

1. A method comprising:
receiving, with one or more processors, a first image from a first user;
analyzing the first image, with the one or more processors, to recognize an object in the first image;
receiving, with the one or more processors, a comment related to the recognized object in the first image;
generating, with the one or more processors, content related to the recognized object in the first image based on the received comment;
prompting the first user to provide a context for the recognized object using a first selectable button;
generating a tag based on the context provided using the first selectable button;
adding, with the one or more processors, the content related to the recognized object in the first image and the tag in a form of a second selectable button to a conversation corresponding to the recognized object in the first image, wherein the tag, when selected, causes other objects associated with the tag to be displayed;
receiving a second image from a second user;
determining that the object that was recognized in the first image is also included in the second image;
identifying a portion of the conversation corresponding to the recognized object based on the second user's prior interactions with the tag associated with the recognized object; and
providing the identified portion of the conversation to the second user.

2. The method of claim 1, further comprising:
determining whether the conversation corresponding to the recognized object in the first image exists; and
in response to determining that the conversation does not exist, generating the conversation with the content related to the recognized object in the first image.

3. The method of claim 1,
wherein the tag is associated with the recognized object in the first image, and wherein determining that the object that was recognized in the first image is also included in the second image is based on the tag associated with the recognized object in the first image.

4. The method of claim 1, further comprising:
receiving an advertisement related to the conversation from an advertiser;
generating the content including the advertisement related to the conversation; and
adding the content including the advertisement to the conversation.

5. The method of claim 1, further comprising:
identifying a plurality of conversations corresponding to the recognized object in the first image;
presenting the plurality of conversations corresponding to the recognized object in the first image to the first user; and
receiving a selection of the conversation corresponding to the recognized object in the first image from the plurality of conversations corresponding to the recognized object in the first image.

6. The method of claim 1, wherein the comment related to the recognized object in the first image comprises a question related to the object recognized in the first image, an answer to a previous question related to the object recognized in the first image, or a statement related to the object recognized in the first image.

7. The method of claim 1, wherein the content related to the recognized object in the first image comprises a category based on the tag associated with the recognized object in the first image.

8. A system comprising:
one or more processors;
an image processor configured to:
receive a first image from a first user;
analyze the first image to recognize an object in the first image;
receive a second image from a second user; and
determine that the object that was recognized in the first image is also included in the second image;
a conversation engine configured to:
receive a comment related to the recognized object in the first image;
generate content related to the recognized object in the first image based on the received comment;
prompt the first user to provide a context for the recognized object using a first selectable button;
generate a tag based on the context provided using the first selectable button;
add the content related to the recognized object in the first image and the tag in a form of a second selectable button to a conversation corresponding to the recognized object in the first image, wherein the tag, when selected, causes other objects associated with the tag to be displayed;
identify a portion of the conversation corresponding to the recognized object based on the second user's prior interactions with the tag associated with the recognized object; and provide the identified portion of the conversation to the second user.

9. The system of claim 8, wherein the conversation engine is further configured to:
determine whether the conversation corresponding to the recognized object in the first image exists; and
in response to determining that the conversation does not exist, generate the conversation with the content related to the recognized object in the first image.

10. The system of claim 8,
wherein the tag is associated with the recognized object in the first image, and wherein determining that the object that was recognized in the first image is also included in the second image is based on the tag associated with the recognized object in the first image.

11. The system of claim 8, wherein the conversation engine is further configured to:
receive an advertisement related to the conversation from an advertiser;
generate the content including the advertisement related to the conversation; and
add the content including the advertisement to the conversation.

12. The system of claim 8, wherein the conversation engine is further configured to:
identify a plurality of conversations corresponding to the recognized object in the first image;
present the plurality of conversations corresponding to the recognized object in the first image to the first user; and
receive a selection of the conversation corresponding to the recognized object in the first image from the plurality of conversations corresponding to the recognized object in the first image.

13. The system of claim 8, wherein the comment related to the recognized object in the first image comprises a question related to the object recognized in the first image, an answer to a previous question related to the object recognized in the first image, or a statement related to the object recognized in the first image.

14. The system of claim 8, wherein the content related to the recognized object in the first image comprises a category based on the tag associated with the object in the first image.

15. A computer program product comprising a non-transitory computer usable medium including a computer readable program, wherein the computer readable program when executed on a computer causes the computer to:
receive a first image from a first user;
analyze the first image to recognize an object in the first image;
receive a comment related to the recognized object in the first image;
generate content related to the recognized object in the first image based on the received comment;
prompt the first user to provide a context for the recognized object using a first selectable button;
generate a tag based on the context provided using the first selectable button;
add the content related to the recognized object in the first image and the tag in a form of a second selectable button to a conversation corresponding to the recognized object in the first image, wherein the tag, when selected, causes other objects associated with the tag to be displayed;
receive a second image from a second user;
determine that the object that was recognized in the first image is also included in the second image;
identify a portion of the conversation corresponding to the recognized object based on the second user's prior interactions with the tag associated with the recognized object; and
provide the identified portion of the conversation to the second user.

16. The computer program product of claim 15, wherein the computer readable program is further configured to:
determine whether the conversation corresponding to the recognized object in the first image exists; and
in response to determining that the conversation does not exist, generate the conversation with the content related to the recognized object in the first image.

17. The computer program product of claim 15, wherein the tag is associated with the recognized object in the first image, and wherein determining that the object that was recognized in the first image is also included in the second image is based on the tag associated with the recognized object in the first image.

18. The computer program product of claim 15, wherein the computer readable program is further configured to:
receive an advertisement related to the conversation from an advertiser;
generate the content including the advertisement related to the conversation; and
add the content including the advertisement related to the conversation.

19. The computer program product of claim 15, wherein the computer readable program is further configured to:
identify a plurality of conversations corresponding to the recognized object in the first image;
present the plurality of conversation corresponding to the recognized object in the first image to the first user; and
receive a selection of the conversation corresponding to the recognized object in the first image from the plurality of conversations corresponding to the recognized object in the first image.

20. The computer program product of claim 15, wherein the comment related to the recognized object in the first image comprises a question related to the object recognized in the first image, an answer to a previous question related to the object recognized in the first image, or a statement related to the object recognized in the first image.

* * * * *